United States Patent
Zhu et al.

(10) Patent No.: US 7,424,112 B2
(45) Date of Patent: Sep. 9, 2008

(54) CIPHERTEXT SWITCHING FOR SYNTAX COMPLIANT ENCRYPTION

(75) Inventors: Bin Zhu, Edina, MN (US); Yang Yang, Jiangsu Province (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 673 days.

(21) Appl. No.: 11/081,279

(22) Filed: Mar. 16, 2005

(65) Prior Publication Data

US 2006/0210081 A1 Sep. 21, 2006

(51) Int. Cl.
*H04L 9/00* (2006.01)
(52) U.S. Cl. .......................................... 380/28; 380/42
(58) Field of Classification Search .................... 380/28, 380/42; 713/169, 189
See application file for complete search history.

(56) References Cited

U.S. PATENT DOCUMENTS

| | | | | |
|---|---|---|---|---|
| 6,094,485 A | * | 7/2000 | Weinstein et al. | 380/30 |
| 6,434,561 B1 | * | 8/2002 | Durst et al. | 707/10 |
| 7,047,420 B2 | * | 5/2006 | Douceur et al. | 713/190 |

* cited by examiner

*Primary Examiner*—Hosuk Song
(74) *Attorney, Agent, or Firm*—Lee & Hayes, PLLC (57) ABSTRACT

Systems and methods providing ciphertext switching for syntax compliant encryption are described. In one aspect, intermediate ciphertext is generated from syntax compliant plaintext. Post-processing is applied to the intermediate ciphertext to determine if there are any illegal symbols in the intermediate ciphertext. If an illegal symbol is located, the illegal symbol in the intermediate ciphertext is switched with a corresponding plaintext symbol. One or more iterations of the post-processing and switching operations result in syntax compliant ciphertext.

20 Claims, 4 Drawing Sheets

CIPHERTEXT SWITCHING FOR SYNTAX COMPLIANT ENCRYPTION

TECHNICAL FIELD

The systems and methods of this specification relate to cryptology.

BACKGROUND

A multimedia bitstream organizes data into groups, referred to as packets, for easy parsing, fast searching, error resilience, etc. A packet includes header fields and data fields. A packet starts with a unique marker to indicate start of a packet, and may end with another unique marker to indicate the end of the packet. Markers are a set of special binary strings that are reserved in a multimedia format. To facilitate identification of each packet, data codes are carefully designed to avoid emulation of any markers in a data field. Otherwise a bitstream may be parsed incorrectly to generate an improper result.

For example, in the JPEG 2000 image coding standard, a compressed bitstream in a packet contributed from coding passes of a code-block does not allow any values in the range of hexadecimal 0xFF90 through 0xFFFF for any two consecutive bytes of coded data. JPEG 2000 does not allow a data bitstream ending with a byte of hexadecimal 0xFF either. In another example, data codes using the MPEG-4 Fine Granularity Scalability (FGS) video coding standard are carefully designed to avoid emulation of any markers in a data field. For instance, in MPEG-4 FGS, compressed bit-plane data in the enhancement layer is grouped into packets separated by a bit-plane start code denoted as fgs_bp_start_code or, if the flag fgs_resync_marker_disable is set to 0, a resynchronization marker denoted as fgs_resync_marker. Both markers are byte-aligned, i.e., start at a byte boundary. The marker fgs_bp_start_code starts with 23 bits of 0 followed by 0xA plus another five bits to indicate which bit-plane the data belongs to. The marker fgs_resync_marker is 22 bits of 0 followed by bit 1. Therefore compressed bit-plane data in a packet does not allow byte-aligned 22 consecutive bits of 0.

Multimedia is often protected to prevent unauthorized consumption. Typical protection is to encrypt multimedia data and to restrict access to the decryption key(s) to only authorized users. This approach is widely used in multimedia Digital Rights Management (DRM), which provides persistent protection for content from creation to consumption. A good cipher applied to multimedia data produces "random" ciphertext which may emulate markers that the original syntax is carefully designed to avoid. Conventional methods to ensure correct decryption and decoding of encrypted multimedia content add additional information to unencrypted header fields of a packet (e.g., length of the ciphertext or a number of occurrences of marker emulation in the data field). However, the resulting bitstream may not be syntax compliant. This is because spurious markers inserted into ciphertext typically destroy syntax compliance of ciphertext.

A syntax noncompliant approach to encrypting multimedia data has several drawbacks. First, the encrypted bitstream may not be backward compatible with a corresponding decoder. For example, adding non-standard header fields to a packet may lead a compliant but encryption-unaware decoder to parse a packet incorrectly, and thereby, produce undesired results. Non-syntax compliant encryption may also impair fast random access of encrypted multimedia, a desirable feature, for example, when playing long audiovisual content. Non-syntax compliant encryption may also cause wrong parsing and false synchronization when error or data loss occurs. In this latter scenario, deteriorated error resilience may result.

In view of the above, and given a syntax which does not allow certain strings to appear in a bitstream and arbitrary syntax compliant plaintext, systems and methods to encrypt the plaintext to generate syntax compliant ciphertext that does not contain any illegal substreams are highly desired.

SUMMARY

Systems and methods providing ciphertext switching for syntax compliant encryption are described. In one aspect, intermediate ciphertext is generated from syntax compliant plaintext. Post-processing is applied to the intermediate ciphertext to determine if there are any illegal symbols in the intermediate ciphertext. If an illegal symbol is located, the illegal symbol in the intermediate ciphertext is switched with a corresponding plaintext symbol. One or more iterations of the post-processing and switching operations result in syntax compliant ciphertext.

BRIEF DESCRIPTION OF THE DRAWINGS

In the Figures, the left-most digit of a component reference number identifies the particular Figure in which the component first appears.

DETAILED DESCRIPTION

Overview

For purposes of discussion, a symbol in a stream is a group of data that should be checked for potential syntax violation. A symbol that is not allowed by syntax is called an illegal symbol. The particular syntax used in the following described systems and methods providing ciphertext switching for syntax compliant encryption is arbitrary. Different syntax typically has different symbol definitions. For example, a symbol in the compressed bitstream of JPEG 2000 is two consecutive bytes, i.e., byte-aligned sixteen consecutive bits, for internal bytes, or the last byte. Whereas, an illegal symbol in the compressed bitstream of JPEG 2000 consists of a byte of value 0xFF and, in case the symbol is two bytes long, followed by a byte of values in the range from hexadecimal 0xFF90 through 0xFFFF. In another example, a symbol in MPEG-4 FGS consists of byte-aligned twenty-two bits. An illegal symbol in this latter case consists of twenty two bits of zero (0).

The systems and methods for ciphertext switching to achieve syntax compliant encryption implement post-processing operations after conventional stream cipher encryption to "switch out" offensive substream(s) in the ciphertext obtained from the conventional encryption. An offensive substream is one or more consecutive and possibly overlapping illegal symbols that are not allowed in compliant syntax.

More particularly, the systems and methods replace offensive substream(s) with corresponding substreams from the plaintext. This forces ciphertext syntax compliance because plaintext is always syntax compliant. The systems and methods for ciphertext switching for compliant encryption of general syntax produce ciphertext of exactly the same size as the corresponding input plaintext (plainstream). As described below, the ciphertext (cipherstream) switching scheme is efficient, fast, and has excellent error resilience.

These and other aspects of the systems and methods providing ciphertext switching for syntax compliant encryption are now described in greater detail.

An Exemplary System

Although not required, the systems and methods providing ciphertext switching for syntax compliant encryption are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
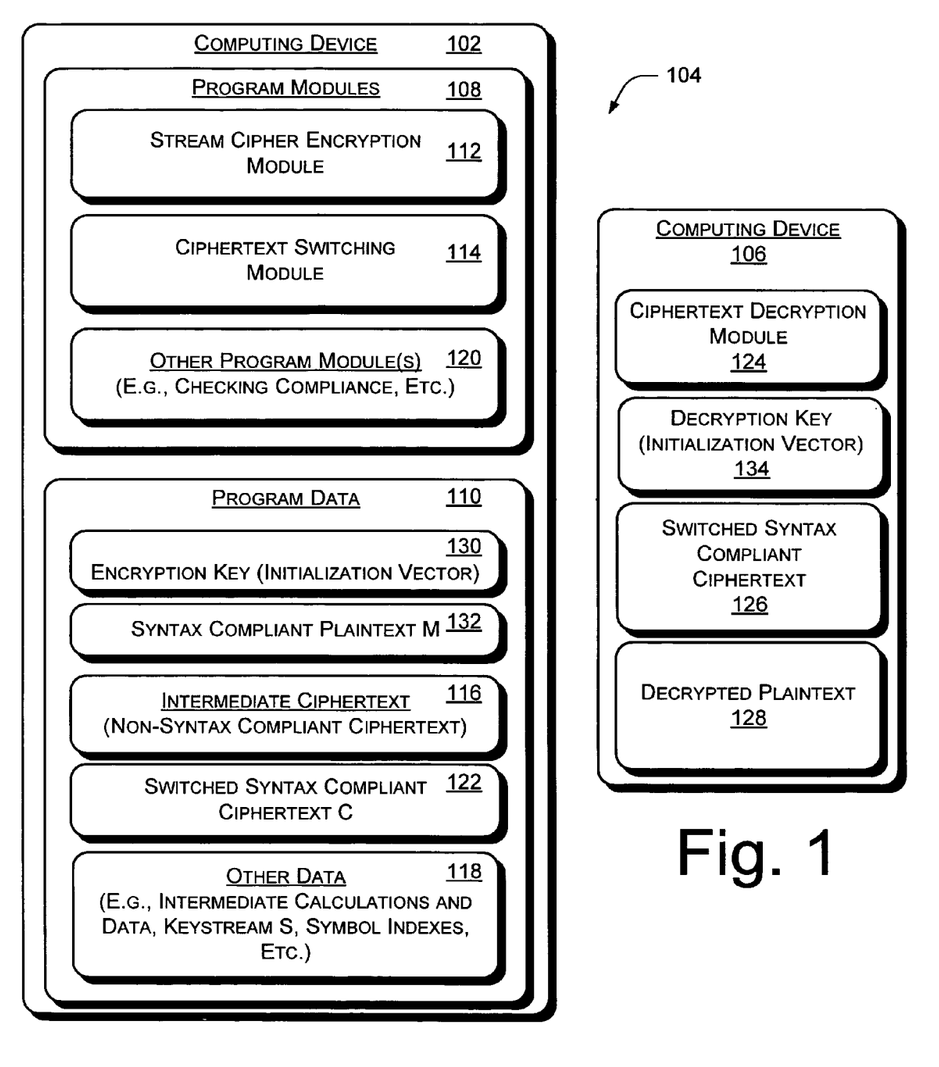
FIG. 1 illustrates an exemplary system providing ciphertext switching for syntax compliant encryption.

FIG. 1 illustrates an exemplary system 100 providing ciphertext switching for syntax compliant encryption. System 100 includes a first computing device 102 coupled over a communications network 104 to a second computing device 106. Communications network 104 may include any combination of internal bus of a computing device, a local area network (LAN) and a general wide area network (WAN) communication environments, such as those which are commonplace in offices, enterprise-wide computer networks, intranets, and the Internet. Computing devices 102 and 106 represent any type of computing device such as a personal computer, a laptop, a server, handheld or mobile computing device (e.g., a cellular phone, personal digital assistant), and/or so on.

Computing device 102 includes program module(s) 108 and program data 110. Program modules 108 include, for example, stream cipher encryption module 112 and ciphertext switching module 114. Stream cipher encryption module 112 encrypts plaintext 132 represented as M to generate intermediate ciphertext 116. Intermediate ciphertext 116 is represented as R. Encryption key 130 is used in the encryption operations executed by stream cipher encryption module 112. In some implementations, initialization vector shown as "Initialization Vector" in 130 is also used with module 112. The particular stream cipher implemented by stream cipher encryption module 112 is an arbitrary XOR-based synchronous stream cipher, where XOR means exclusive-or operation. For example, the stream encryption cipher can be RC4, SEAL, etc. Intermediate ciphertext 116 may not be syntax compliant with respect to the particular stream encryption cipher implemented by stream cipher encryption module 112.

In one implementation, stream cipher encryption module 112 encrypts plaintext M of n bits as follows. A keystream S with the same size as the plaintext is generated with a secure keystream generator inside the stream cipher encryption module 114, and then XORed with the plaintext M to produce intermediate ciphertext R 116: $R=M \oplus S$, where "$\oplus$" denotes the bitwise XOR operation. For purposes of exemplary illustration, the keystream S is shown in "other data" 118. The operations of module 112 can be reversed to recover the plaintext M 132 from the intermediate ciphertext R 116 in a decryption process by XORing the intermediate ciphertext R 116 with the same keystream S: $M=C \oplus S$.

Ciphertext switching module 114 post-processes intermediate ciphertext 116 by searching the intermediate ciphertext 116 from the beginning to end to locate any offensive substream(s) and to "switch out" offensive substream(s) in intermediate ciphertext R 116 with corresponding substreams from plaintext M 132. If intermediate ciphertext 116 is not syntax compliant, then one or more portions of intermediate ciphertext 116 are "switched" back to plaintext. Since plaintext is always syntax compliant, this forces ciphertext to be syntax compliant. For purposes of exemplary illustration, intermediate ciphertext 116, wherein all illegal symbols have been replaced with syntax compliant plaintext, is shown as syntax compliant ciphertext C 122.

To post-processes intermediate ciphertext 116, ciphertext switching module 114 evaluates each cipher-symbol $R_i$ in the intermediate ciphertext R 116 to determine if the symbol is syntax compliant or not. If the symbol is an illegal symbol, i.e., a symbol that is not allowed according to a specific underlying syntax, then the symbol is claimed to be syntax non-compliant. Responsive to identifying a non-compliant symbol $R_i$ in the intermediate ciphertext R, generated from a plain-symbol $M_i$ in the plaintext, and a sub-keystream $S_i$ in the keystream, $R_i = M_i \oplus S_i$, ciphertext switching module 114 replaces the non-compliant cipher-symbol $R_i$ with the corresponding plain-symbol $M_i$: $R_i = M_i$. Since symbol $M_i$ is syntax compliant, resulting symbol $R_i$ is also syntax compliant. Ciphertext switching module 114 sequentially repeats these operations from beginning to end of the intermediate ciphertext 116 until there are no illegal symbols in the ciphertext R. The result is the output of syntax compliant ciphertext C, which is shown as compliant ciphertext 122.

Overlapping Symbols

Figure 2:
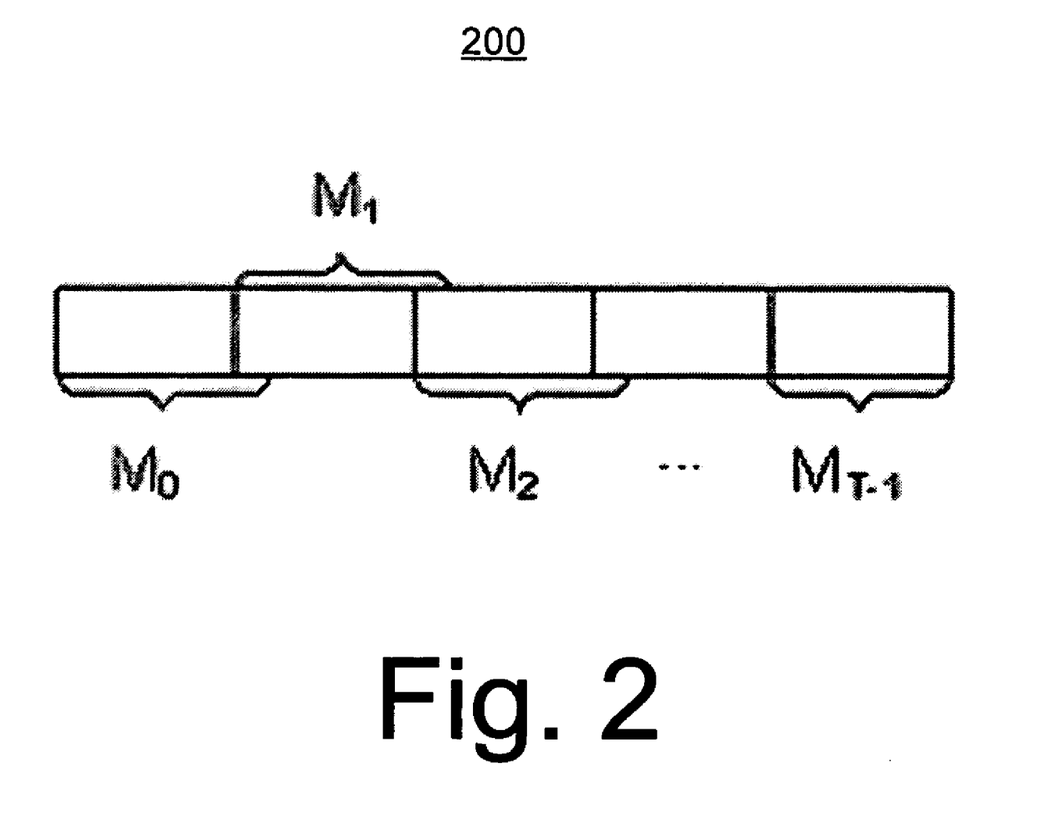
FIG. 2 shows an example of neighboring symbols with a partial overlap, such as in a JPEG 2000 encoding.

FIG. 2 shows an example of neighboring symbols with a partial overlap, such as in a JPEG 2000 encoding. In this example, symbol $M_0$ overlaps symbol $M_1$, and symbol $M_1$ overlaps symbol $M_2$. For purposes of discussion, two overlapping symbols $M_i$ and $M_j$ are denoted as $M_i \cap M_j \neq \phi$, where two disjoint symbols $M_i$ and $M_j$ are denoted as $M_i \cap M_j = \phi$. An encoded stream consisting of T symbols $M_1, M_2, \Lambda, M_T$ is denoted as $M=\{M_0, M_1, \Lambda, M_{T-1}\}$. An operation such as the XOR operation on two streams $M=\{M_0, M_1, \Lambda, M_{T-1}\}$ and $S=\{S_0, S_1, \Lambda, S_{T-1}\}$ is denoted as $M \oplus S = \{M_0 \oplus S_0, M_1 \oplus S_1, \Lambda, M_{T-1} \oplus S_{T-1}\}$. This representation indicates the operation on each symbol. There is only one XOR operation on the overlapping part of two symbols. Such a representation is for better illustration of exemplary implementations.

In another example of symbols with overlapping substreams in a stream, consider that in a compressed bitstream of JPEG 2000, a symbol in a data bitstream is byte-aligned 16 bits for internal bytes and 8 bits for the last byte. This means that one symbol overlaps 8 bits or one byte with the next symbol: the last 8 bit in a symbol is the first 8 bit in the next symbol.

In view of the above, and after ciphertext switching module 114 switches an illegal symbol (i.e., a non-syntax compliant symbol) with corresponding plaintext, it is possible that a previously processed symbol in the resulting ciphertext that consists of both partial replaced symbol and partial non-replaced symbol may no longer be legal, or its corresponding decrypted symbol may be illegal. (At this point, the resulting ciphertext is intermediate ciphertext 116 that has been modified with the novel switching operations described above).

This is because neighboring symbols may partially overlap one another. To address this possibility of overlapping symbols, ciphertext switching module 114 contains both forward and backward checking operations. In a forward checking operation, ciphertext switching module 114 searches for illegal symbols in the intermediate ciphertext 116 from beginning to end. Whenever ciphertext switching module 114 identifies and replaces an illegal symbol, which for purposes of this discussion is referred to as the "original replaced symbol", in intermediate ciphertext 116 in the forward checking operation, ciphertext switching module 114 then alternately performs each of multiple types of backward checking operations, until not one of the backward checking operations identifies an illegal symbol for replacement with compliant syntax. Once backward checking operations are done, the forward checking operation resumes from the original replaced symbol to check illegal symbol(s) for the rest of the symbols in the intermediate ciphertext 116. The above forward-backward checking operations are applied alternatively until all the symbols in the intermediate ciphertext 116 have been checked. The resulting intermediate ciphertext 116 is then syntax compliant ciphertext C 122 which is the output of the described syntax compliant encryption system.

In this implementation, there are two (2) types of backward checking operations. A first type evaluates the intermediate ciphertext 116 for illegal symbol(s), i.e., symbols in the intermediate ciphertext 116 that are not compliant to the syntax under discussion. To this end, ciphertext switching module 114 systematically evaluates each ciphertext symbol for illegal symbols in a reverse direction starting from the particular symbol that has just been replaced, which for purposes of this discussion is referred to as the "just replaced symbol". If all symbols, including replaced and non-replaced symbols are legal, then this particular backward checking operation is complete. However, if ciphertext switching module 114 locates an illegal symbol in this particular backward checking operation, ciphertext switching module 114 replaces that located symbol and all the symbols between that located symbol and the just replaced symbol with the corresponding plaintext symbols, and re-starts this particular backward checking process from that located symbol. Thus, this checking operation continues until all symbols in the intermediate ciphertext 116 from the beginning symbol to the original replaced symbol are syntax compliant symbols.

In one implementation of this particular backward checking operation, the backward checking operation stops once all the previous symbols overlapping with the just replaced symbols are legal. This particular implementation of the backward checking operation does not have to check symbols to the first symbol due to the fact that disjoint symbols are not affected by the recent symbol switching operations and the previous symbols have already been checked in previous checking operations. Exemplary implementations of this backward checking operation are described below in reference to FIG. 3 and TABLE 1.

A second backward checking operation ensures all the cipher-symbols from the first symbol to the original replaced symbol are decrypted correctly, i.e., the replaced symbols in the encryption process can be correctly located in the decryption process. More specifically, this particular backward checking operation applies the stream cipher decryption to the cipher-symbols between the just replaced symbol and the symbol that was replaced in previous forward checking operations and is closest to the just replaced symbol, including the two delimiting replaced symbols, if such a replaced symbol exists. Otherwise, this particular backward checking operation applies the stream cipher decryption to the cipher-symbols between the just replaced symbol and the first symbol, including the delimiting first symbol and the just replaced symbol, if there is no replaced symbol preceding the just replaced symbol. If both delimiting symbols are replaced symbols, the two symbols corresponding to the two delimiting symbols are replaced with their corresponding plaintext symbols. If the beginning delimiting symbol is not a replaced symbol, the symbol corresponding to the end delimiting symbol is replaced with its corresponding plaintext symbol. For purposes of this discussion, the resulting symbols are referred to as decrypted symbols. This particular backward checking ensures that all those decrypted symbols between (and including) the two aforementioned delimiting symbols are legal.

The decryption in this second backward checking is described in detail as follows. Suppose the just replaced symbol, i.e., the end delimiting symbol, is $R_j$, and the beginning delimiting symbol is $R_i$. $R_i$ is either the symbol which is replaced in previous forward checking operation and closest to $R_j$, if such a symbol exists, or the first symbol otherwise. The stream cipher decryption is applied to all the symbols $R_k$, $i \leq k \leq j$ in the intermediate ciphertext. For a XOR-based stream cipher as implemented in this exemplary system, stream cipher decryption is identical to the corresponding stream cipher encryption. The resulting symbols are $M'_k = R_k \oplus S_k$, $i \leq k \leq j$, where S is the keystream used in encryption performed by the stream cipher encryption module 112. Then $M'_j$ is replaced by its corresponding plaintext symbol $M_j$: $M'_j = M_j$. If $R_i$ is a replaced symbol, $M'_i$ is also replaced by its corresponding plaintext symbol $M_i$: $M'_i = M_i$. Due to symbol overlapping, replacement of a symbol may affect other overlapping neighbor symbols. The obtained symbols $M'_k$ $i \leq k \leq j$ are referred to as decrypted symbols or decrypted plaintext symbols in discussion of the second backward checking operation performed by ciphertext switching module 114 in this exemplary implementation.

This second backward check operation performed by ciphertext switching module 114 proceeds backwards from the just replaced symbol until the closest preceding replaced symbol, if such a symbol exists, or the first symbol otherwsie, to check each symbol if its corresponding decrypted symbol is an illegal symbol. If the symbols overlapping with the just replaced symbol are all decrypted to be legal symbols, i.e., syntax compliant symbols, this particular backward checking operation is complete. Otherwise this particular backward checking operation locates the symbol decrypted to be illegal, and replaces all the symbols between the just replaced symbol and that located symbol, including that located symbol, and restart this particular backward checking operation from the located symbol. Exemplary implementations of this second type of backward checking operation are described below in reference to FIG. 3 and TABLE 1.

In this implementation, if there exist overlapping symbols, for example, two neighboring symbols $R_i$ and $R_{i+1}$ overlap each other in intermediate ciphertext 116, the overlappig portion appears only once in the actual intermediate ciphertext. The representation $R = \{R_0, R_1, \Lambda, R_{T-1}\}$ of a stream R by its consisting, possibly overlapping, symbols $\{R_0, R_1, \Lambda, R_{T-1}\}$ are used to explain how the exemplary implementation works. Operations on overlapping portions is also actually applied once. For example, the XOR operation applied to plaintext 132 $M = \{M_0, M_1, \Lambda, M_{T-1}\}$ and keystream $S = \{S_0, S_1 \Lambda, S_{T-1}\}$ by stream cipher encryption module 112 is denoted as $M \oplus S = \{M_0 \oplus S_0, M_1 \oplus S_1, \Lambda, M_{T-1} \oplus S_{T-1}\}$. The actual operation is to XOR plaintext 132 M and keysetream S byte-by-byte.

A second computing device, device 106 of FIG. 1, also includes program modules and program data to decrypt syntax compliant ciphertext 122 generated by the device 102, which has been communicated by an application (e.g., an application in "other program module(s) 120") to computing device 106. For instance, computing device 106 includes syntax compliant ciphertext decryption module 124 to decrypt switched syntax compliant ciphertext 126 to obtain decrypted plaintext 128. Decryption key 134 is also used in this process. For the exemplary implementation, the decryption device 106 is identical to the encryption device except the input and output are reversed. For encryption device 102, the input is syntax compliant plaintext and the output is syntax compliant ciphertext. For decryption device 106, the input is syntax compliant ciphertext generated by device 102, and the output is decrypted plaintext produced by the ciphertext switching cipher.

An Exemplary Procedure

Figure 3:
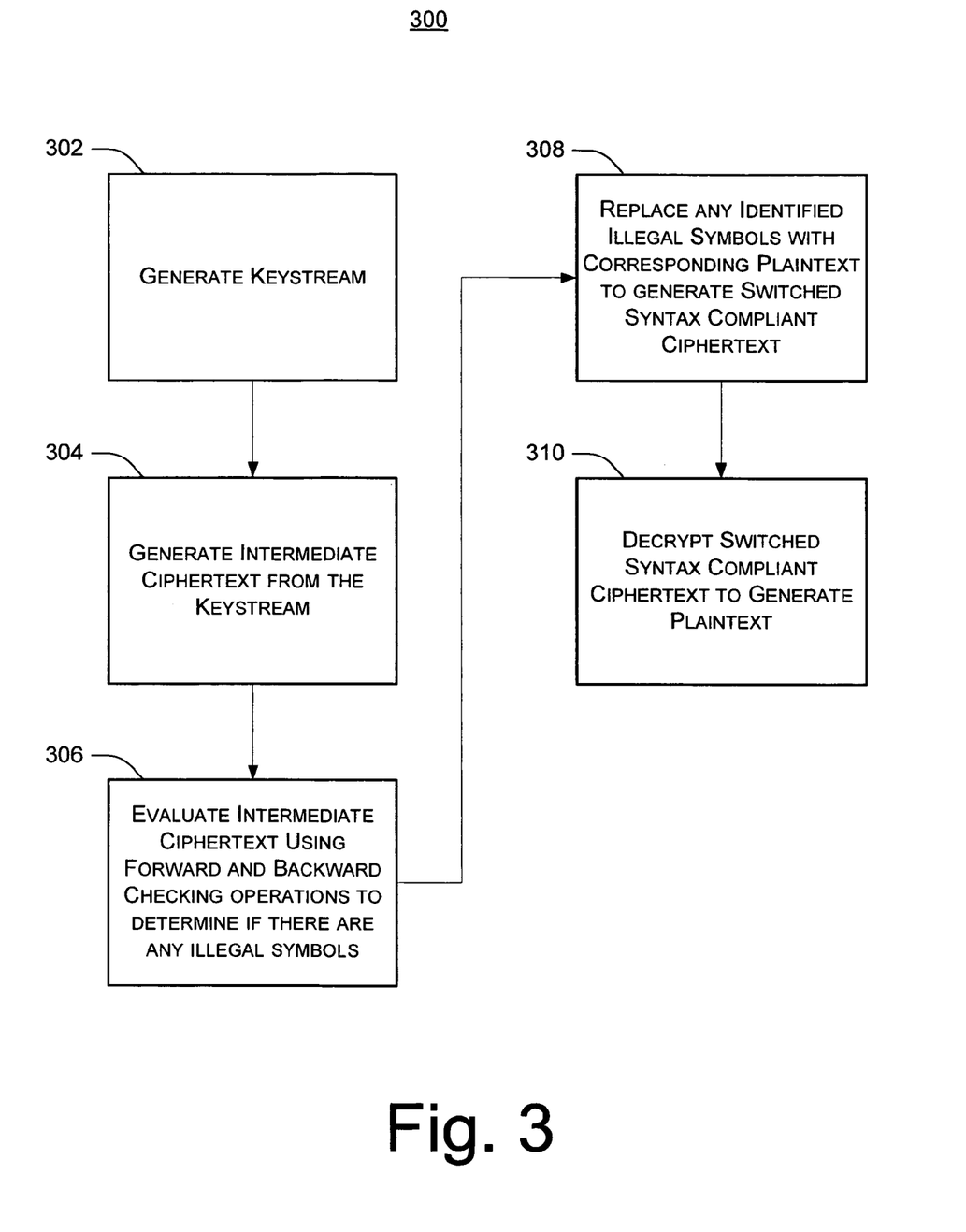
FIG. 3 shows an exemplary procedure to ciphertext switching for syntax compliant encryption and decryption.

FIG. 3 shows an exemplary procedure 300 providing ciphertext switching for syntax compliant encryption and decryption. For purposes of exemplary illustration, the operations of the procedure are described in reference to the components of FIG. 1. In the figures, the left-most digit of a component reference number identifies the particular figure in which the component first appears. Let $M=\{M_0, M_1, \Lambda, M_{T-1}\}$ of T symbols be a syntax compliant plaintext of n bits input to a ciphertext switching encryption cipher. Let $C=\{C_0, C_1, \Lambda, C_{T-1}\}$ be the output of syntax compliant ciphertext 122 (FIG. 1) from a ciphertext switching encryption cipher which has the same length as the input M. The exemplary ciphertext switching implemented by ciphertext switching module 114 is as follows:

At block 302, generate a keystream $S=\{S_0, S_1, \Lambda, S_{T-1}\}$ of the same length as M with a stream cipher's secure sequence generator. Encryption key and possibly Initialization Vector (IV) 130 are used in this step. The keystream, is shown as keystream S in "other data" 118. At block 304, produce a stream $R=M\oplus S=\{M_0\oplus K_0, M_1\oplus K_1, \Lambda, M_{T-1}\oplus K_{T-1}\}$ in the same way as a conventional stream cipher, where "$\oplus$" is the bitwise XOR operation. The stream R is shown as intermediate ciphertext 116. At block 306, post-process (i.e., evaluate) intermediate ciphertext 116 (R) using forward and backward checking operations to determine if there are any illegal symbols. At block 308, any identified illegal symbols in the checking operations 306 are replaced with corresponding plaintext to create switched syntax compliant ciphertext 122.

At block 310, ciphertext decryption module 124 decrypts syntax compliant ciphertext 122 with the corresponding ciphertext switching cipher to generate decrypted plaintext 128. Decryption operations include operational aspects of blocks 302, 304, 306, and 308. Decryption key and possibly Initialization Vector (IV) 134 are used in these operations.

TABLE 1 shows an exemplary implementation of the encryption procedure in 300 of FIG. 3 providing ciphertext switching for syntax compliant encryption. The same procedure is also used in ciphertext switching decryption.

TABLE 1

EXEMPLARY CIPHERTEXT SWITCHING
FOR SYNTAX COMPLIANT ENCRYPTION

1) Generate a keystream $S = \{S_0, S_1, \Lambda, S_{T-1}\}$ of the same length as plaintext M 132 of FIG. 1 with a stream cipher's secure sequence generator. Encryption key and possibly Initialization Vector (IV) are used in this step. (I.e., block 302 of FIG. 3).

2) Produce a stream $R = M \oplus S = \{M_0 \oplus S_0, M_1 \oplus S_1, \Lambda, M_{T-1} \oplus S_{T-1}\}$ in using a conventional stream cipher, where "$\oplus$" is the bitwise XOR operation. (I.e., block 304 of FIG. 3).

3) Initialize a current symbol index currIdx to 0: currIdx = 0, and index of last modified symbol in last group of replacement operations to −1: lastIdx = −1. These exemplary operations represent operations of a portion of block 306 of FIG. 3, wherein indexes are being prepared to selectively evaluate ciphertext symbols for syntax compliance.

4) Run the current symbol index currIdx from the current symbol to the last symbol T −1 to check for illegal symbols in R. If an illegal symbol at some position indicated by currIdx is found, go to next step 5. These exemplary operations represent operations of a portion of block 306 of FIG. 3. If no illegal symbol is found when currIdx runs to the last symbol T −1 go to step 9.

5) Replace the illegal symbol R(currIdx) with the plaintext symbol M(currIdx): R(currIdx) ← M(currIdx), where R(currIdx) denotes the ciphersymbol with subscript index as currIdx. These exemplary operations represent operations of a portion of block 308 of FIG. 3. Set the index justModIdx of just replaced symbol be equal to currIdx: justModIdx = currIdx, to prepare for any additional symbol checking.

6) Check backward for decrypted symbols:
   6.a) Run backward checking for symbols with the index backIdx from justModIdx −1 to maximum of 0 and lastIdx with incremental value −1 that overlaps with the symbol R(justModIdx):
      backIdx = justModIdx - 1 : −1 :max(0, lastIdx) where
      R(backIdx) ∩ R(justModIdx) ≠ φ.
   These exemplary operations represent operations of a portion of block 306 of FIG. 3.
   6.b) If R(backIdx) is decrypted to be an illegal symbol, replace all the ciphertext symbols $R_i$ between backIdx and justModIdx with the corresponding plaintext symbols:
      $R_i \leftarrow M_i$, backIdx $\leq$ i < justModIdx.
   Set justModIdx=backIdx, and go back to step 6.a).
   Otherwise, i.e., if the symbols in the range specified in 6.a) are all decrypted to be legal symbols, go to step 7.

TABLE 1-continued

EXEMPLARY CIPHERTEXT SWITCHING FOR SYNTAX COMPLIANT ENCRYPTION

|   |   |   |
|---|---|---|
|   |   | Decryption of a symbol R(backIdx) in this step is applied in the following steps. First R(backIdx) is XORed with the corresponding keystream symbol S(backIdx):<br>M'(backIdx) = R(backIdx) $\oplus$ S(backIdx). Then it checks if R(backIdx) overlaps with the symbol R(justModIdx) as well as the symbol R(lastIdx) if lastIdx is not negative. If there exists any overlapping, the overlapping portion(s) is replaced by the corresponding portion(s) of the plaintext M. The resulting symbol is the decrypted symbol of R(backIdx) mentioned previously in this sub-step.<br>These exemplary operations represent operations of a portion of block 308 of FIG. 3. |
| 7) | Check backward for ciphertext symbols: |   |
|   | 7.a) | Run backward checking for symbols with the index backIdx from justModIdx - 1 to maximum of 0 and lastIdx. with incremental value −1 that overlaps with the symbol R(justModIdx):<br>backIdx = justModIdx - 1 : −1 : max(0, lastIdx) where<br>$\quad$ R(backIdx) $\cap$ R(justModIdx) $\neq \phi$.<br>These exemplary operations represent operations of a portion of block 306 of FIG. 3. |
|   | 7.b) | If R(backIdx) is an illegal symbol, replace all the ciphertext symbols $R_i$ between backIdx and justModIdx with the corresponding plaintext symbols:<br>$\quad R_i \leftarrow M_i$, backIdx $\leq$ i < justModIdx.<br>Set justModIdx=backIdx, and go back to step 7.a).<br>Otherwise, i.e., if the symbols in the range specified in 7.a) are all legal symbols, go to step 8.<br>These exemplary operations represent operations of a portion of block 308 of FIG. 3. |
| 8) | If no symbol is replaced in both steps 6) and 7), set lastIdx=currIdx and currIdx=currIdx+1, then go back to step 4). Otherwise go back to step 6). |   |
| 9) | Output R as the syntax compliant ciphertext C 122 : C = R. This syntax compliant ciphertext represents switched syntax compliant ciphertext 122 of FIG. 1, which can be decrypted as per operations of block 310 of FIG. 3. |   |

As indicated in TABLE 1, operations of step 1 represent operations of block 302 (FIG. 3). Operations of step 2 represent operations of block 304. Operations of items 4, 6a, 7a, and 8, represent respective operations of blocks 306, which respectively implement forward and backward checking operations to determine if there are any illegal symbols. Operations of items 5, 6b, and 7b, represent respective operations of blocks 306 to replace any identified illegal symbols with corresponding plaintext, which results in syntax compliant ciphertext 122.

An Exemplary Operating Environment

Figure 4:
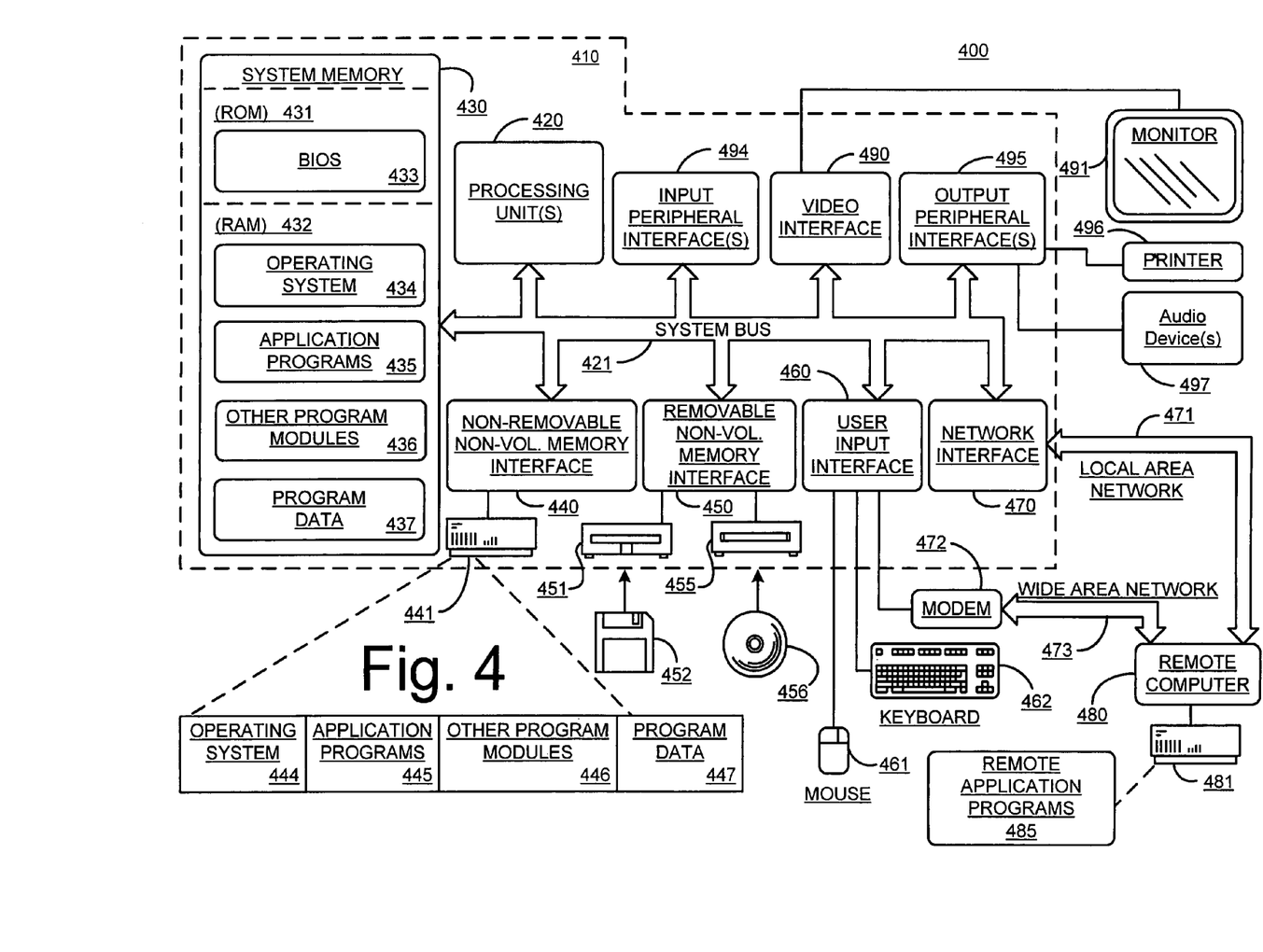
FIG. 4 illustrates an example of a suitable computing environment in which ciphertext switching for syntax compliant encryption may be fully or partially implemented.

FIG. 4 illustrates an example of a suitable computing environment in which ciphertext switching for syntax compliant encryption may be fully or partially implemented. Exemplary computing environment 400 is only one example of a suitable computing environment for the exemplary system of FIG. 1 and exemplary operations of FIGS. 2-3, and is not intended to suggest any limitation as to the scope of use or functionality of systems and methods the described herein. Neither should computing environment 400 be interpreted as having any dependency or requirement relating to any one or combination of components illustrated in computing environment 400.

The methods and systems described herein are operational with numerous other general purpose or special purpose computing system, environments or configurations. Examples of well-known computing systems, environments, and/or configurations that may be suitable for use include, but are not limited to, cellular phones, pocket PC, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 4, an exemplary system providing ciphertext switching for syntax compliant encryption includes a general purpose computing device in the form of a computer 410 implementing, for example, system 100 of FIG. 1. The following described aspects of computer 410 are exemplary implementations of computing devices 102 and/or 106 of FIG. 1. Components of computer 410 may include, but are not limited to, processing unit(s) 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 410 typically includes a variety of computer-readable media. Computer-readable media can be any available media that can be accessed by computer 410 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Application programs 435 includes, for example program modules of computing devices 102 or 104 of FIG. 1. Program data 437 includes, for example, program data of computing devices 102 or 106 of FIG. 1. Operating system 444, application programs 445, other program modules 446, and program data 447 are given different numbers here to illustrate that they are at least different copies.

A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB).

A monitor 491 or other type of display device is also connected to the system bus 421 via an interface, such as a video interface 490. In addition to the monitor, computers may also include other peripheral output devices such as printer 496 and audio device(s) 497, which may be connected through an output peripheral interface 495.

The computer 410 operates in a networked environment using logical connections to one or more remote computers, such as a remote computer 480. In one implementation, remote computer 480 represents computing device 102 or networked computer 104 of FIG. 1. The remote computer 480 may be a personal computer, a server, a router, a network PC, a peer device or other common network node, and as a function of its particular implementation, may include many or all of the elements described above relative to the computer 410, although only a memory storage device 481 has been illustrated in FIG. 4. The logical connections depicted in FIG. 4 include a local area network (LAN) 481 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example and not limitation, FIG. 4 illustrates remote application programs 485 as residing on memory device 481. The network connections shown are exemplary and other means of establishing a communications link between the computers may be used.

CONCLUSION

Although the systems and methods providing ciphertext switching for syntax compliant encryption have been described in language specific to structural features and/or methodological operations or actions, it is understood that the implementations defined in the appended claims are not necessarily limited to the specific features or actions described. For example, although ciphertext switching module 114 (FIG. 1) and ciphertext decryption module 124 are shown on different respective computing devices (i.e., devices 102 and 106), in another implementation, logic associated with these program modules can be implemented on a single computing device (e.g., computing device 102). Accordingly, the specific features and operations of system 100 are disclosed as exemplary forms of implementing the claimed subject matter.

The invention claimed is:

1. A method comprising:
   generating intermediate ciphertext from syntax compliant plaintext;
   post-processing the intermediate ciphertext to determine if there are any illegal symbols in the intermediate ciphertext;
   responsive to identifying an illegal symbol, switching the illegal symbol with a corresponding plaintext symbol to create a switched corresponding plaintext symbol; and
   responsive to switching the illegal symbol with a corresponding plaintext symbol:
   (a) decrypting symbol(s) backwards from the switched plaintext symbol to a preceding delimiting symbol of the intermediate ciphertext to detect any symbol that cannot be decrypted to a syntax compliant symbol;
   (b) responsive to detecting a symbol that cannot be decrypted to a syntax compliant symbol, replacing the symbol and all symbol(s) between the symbol and the switched corresponding plaintext symbol, with a respective corresponding plaintext symbol; and
   (c) if the symbol was not a preceding delimiting symbol, repeating steps (a) and (b),
   wherein operations of post-processing the intermediate ciphertext and one or more iterations of switching the illegal symbol with a corresponding plaintext symbol generate syntax compliant ciphertext from non-syntax compliant ciphertext.

2. The method as recited in claim 1, wherein the post-processing further comprises checking forwards and backwards in the intermediate ciphertext for an illegal symbol.

3. The method as recited in claim 1, further comprising decrypting the syntax compliant ciphertext to generate the syntax compliant plaintext.

4. The method as recited in claim 1, further comprising:
   decrypting the syntax compliant ciphertext based on an XOR of replaced symbol(s) with a keystream to generate respective illegal symbol(s); and
   switching the illegal symbol(s) to corresponding ciphertext symbol(s) to generate the syntax compliant plaintext.

5. The method as recited in claim 1, further comprising:
   decrypting the syntax compliant ciphertext based on an XOR of replaced symbol(s) with a keystream to generate respective illegal symbol(s).

6. A computer-readable medium comprising computer-program instructions executable by a processor for:
   generating intermediate ciphertext from syntax compliant plaintext;
   post-processing the intermediate ciphertext to determine if there are any illegal symbols in the intermediate ciphertext;
   responsive to identifying an illegal symbol, switching the illegal symbol with a corresponding plaintext symbol to create a switched corresponding plaintext symbol; and
   responsive to switching the illegal symbol with a corresponding plaintext symbol:
   (a) iteratively evaluating in a reverse direction each symbol from the switched corresponding plaintext symbol to a preceding delimiting symbol of the intermediate ciphertext, to determine if the ciphertext symbol is syntax compliant;
   (b) responsive to determining that the symbol is not syntax compliant, replacing the symbol and all symbol(s) between the symbol and the switched corresponding plaintext symbol, with a respective corresponding syntax compliant plaintext symbol; and
   (c) if the symbol was not a preceding delimiting symbol, repeating steps (a) and (b),
   wherein operations of post-processing the intermediate ciphertext and one or more iterations of switching the illegal symbol with a corresponding plaintext symbol generate syntax compliant ciphertext from non-syntax compliant ciphertext.

7. The computer-readable medium as recited in claim 6, wherein the computer-program instructions for post-processing further comprise instructions for checking forwards and backwards in the intermediate ciphertext for an illegal symbol.

8. The computer-readable medium as recited in claim 6, wherein the computer-program instructions further comprise instructions for decrypting the syntax compliant ciphertext to generate the syntax compliant plaintext.

9. The computer-readable medium as recited in claim 6, wherein the computer-program instructions further comprise instructions for decrypting the syntax compliant ciphertext based on an XOR of replaced symbol(s) with a keystream to generate respective illegal symbol(s).

10. The computer-readable medium as recited in claim 6, wherein the computer-program instructions further comprise instructions for:
    decrypting the syntax compliant ciphertext based on an XOR of replaced symbol(s) with a keystream to generate respective illegal symbol(s); and
    switching the illegal symbol(s) to corresponding ciphertext symbol(s) to generate the syntax compliant plaintext.

11. A computing device comprising:
    a processor; and
    a memory coupled to the processor, the memory comprising computer-program instructions executable by the processor for:
    generating intermediate ciphertext from syntax compliant plaintext;
    post-processing the intermediate ciphertext to determine if there are any illegal symbols in the intermediate ciphertext;
    responsive to identifying an illegal symbol, switching the illegal symbol with a corresponding plaintext symbol to create a switched corresponding plaintext symbol; and
    determining that all symbols backward from the switched corresponding plaintext symbol to a preceding delimiting symbol of the intermediate ciphertext can be decrypted to a respective corresponding syntax compliant symbol; and
    responsive to the determining, checking backwards for illegal ciphertext symbol(s) by:
    (a) iteratively evaluate in a reverse direction each symbol from the switched corresponding plaintext symbol to preceding delimiting symbol of the intermediate ciphertext, to determine if the symbol is syntax compliant;
    (b) responsive to determining that the symbol is not syntax compliant, replacing the symbol and all symbol(s) between the symbol and the switched corresponding plaintext symbol, with a respective corresponding syntax compliant plaintext symbol; and (c) if the symbol was not a preceding delimiting symbol, repeating steps (a) and (b), wherein operations of post-processing the intermediate ciphertext and one or more iterations of switching the illegal symbol with a corresponding plaintext symbol generate syntax compliant ciphertext from non-syntax compliant ciphertext.

12. The computing device as recited in claim 11, wherein the computer-program instructions for post-processing further comprise instructions for checking forwards and backwards in the intermediate ciphertext for an illegal symbol.

13. The computing device as recited in claim 11, wherein the computer-program instructions further comprise instructions for decrypting the syntax compliant ciphertext to generate the syntax compliant plaintext.

14. The computing device as recited in claim 11, wherein the computer-program instructions further comprise instructions for decrypting the syntax compliant ciphertext based on an XOR of replaced symbol(s) with a keystream to generate respective illegal symbol(s).

15. The computing device as recited in claim 11, wherein the computer-program instructions further comprise instructions for:

decrypting the syntax compliant ciphertext based on an XOR of replaced symbol(s) with a keystream to generate respective illegal symbol(s); and switching the illegal symbol(s) to corresponding ciphertext symbol(s) to generate the syntax compliant plaintext.

16. A method comprising:

generating intermediate ciphertext from syntax compliant plaintext;

post-processing the intermediate ciphertext to determine if there are any illegal symbols in the intermediate ciphertext;

responsive to identifying an illegal symbol, switching the illegal symbol with a corresponding plaintext symbol to create a switched corresponding plaintext symbol; and determining that all symbols backward from the switched corresponding plaintext symbol to a preceding delimiting symbol of the intermediate ciphertext if each respective ciphertext symbol is syntax compliant; and responsive to the determining, checking backwards for illegal decrypted symbol(s) by:

(a) decrypting symbol(s) backwards from the switched corresponding plaintext symbol to a preceding delimiting symbol of the intermediate ciphertext to detect any symbol that cannot be decrypted to a syntax compliant symbol;

(b) responsive to detecting a symbol that cannot be decrypted to a syntax compliant symbol, replacing the symbol and all symbol(s) between the symbol and the switched corresponding plaintext symbol, with a respective corresponding plaintext symbol; and (c) if the symbol was not a preceding delimiting symbol, repeating steps (a) and (b), wherein operations of post-processing the intermediate ciphertext and one or more iterations of switching the illegal symbol with a corresponding plaintext symbol generate syntax compliant ciphertext from non-syntax compliant ciphertext.

17. The method as recited in claim 16, wherein the post-processing further comprises checking forwards and backwards in the intermediate ciphertext for an illegal symbol.

18. The method as recited in claim 16, further comprising decrypting the syntax compliant ciphertext to generate the syntax compliant plaintext.

19. The method as recited in claim 16, further comprising decrypting the syntax compliant ciphertext based on an XOR of replaced symbol(s) with a keystream to generate respective illegal symbol(s).

20. The method as recited in claim 16, further comprising:

decrypting the syntax compliant ciphertext based on an XOR of replaced symbol(s) with a keystream to generate respective illegal symbol(s); and switching the illegal symbol(s) to corresponding ciphertext symbol(s) to generate the syntax compliant plaintext.

\* \* \* \* \*